B. & H. W. PEARSON.
Vehicle-Wheels.
No. 148,745.   Patented March 17, 1874.
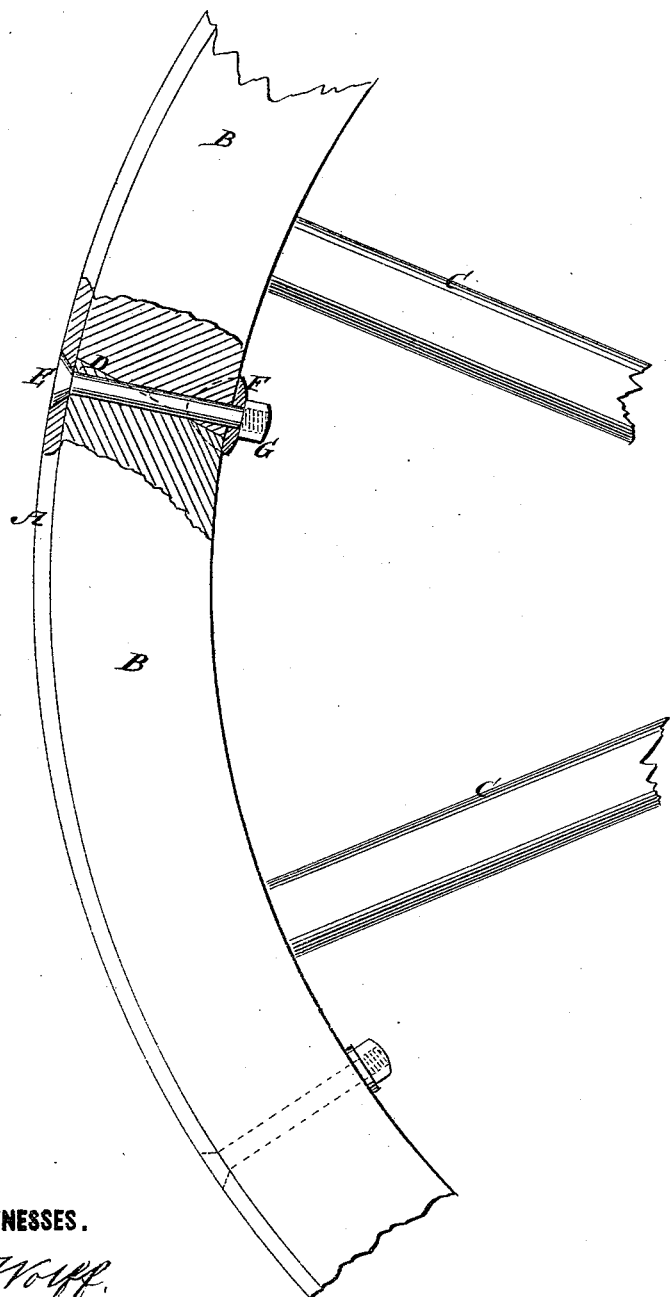
WITNESSES.
E. Wolff
C. Sedgwick
INVENTOR.
B. Pearson
H. W. Pearson
BY
ATTORNEYS.

UNITED STATES PATENT OFFICE.

BENJAMIN PEARSON AND HORACE W. PEARSON, OF NEWBURYPORT, MASSACHUSETTS.

IMPROVEMENT IN VEHICLE-WHEELS.

Specification forming part of Letters Patent No. 148,745, dated March 17, 1874; application filed January 10, 1874.

*To all whom it may concern:*

Be it known that we, BENJAMIN PEARSON and HORACE W. PEARSON, of Newburyport, in the county of Essex and State of Massachusetts, have invented a new and useful Improvement in Wheels, of which the following is a specification:

The invention will first be fully described, and then pointed out in the claim.

The drawing represents a portion of the rim or felly of a wheel, showing a joint constructed according to our invention.

Similar letters of reference indicate corresponding parts.

A represents the tire, B the felly, and C the spokes. D is the joint. E is the joint-bolt, and F the clip under the nut G.

In ordinary wheels, the joints in the felly are made midway between two of the spokes, and the ends are butted together and doweled, the ends being cut off at right angles or parallel with a line passing through the center of the hub of the wheel. The ends of the segments are, therefore, unsupported, except by the dowel and the tire, and the wheel is consequently weak at the felly-joint, and soon becomes flattened at these points, and needs repairing. We remedy this difficulty by making the joint so far from the middle of the space between two of the spokes that the end of one segment will be supported by the spoke, and by cutting the ends or making the joint on a bevel, so that the other segment will act as the key of an arch on the other segment, and be thus supported.

The felly is broken away in the drawing to show the bevel-joint, the bolt, and the clip.

While the joint is made beveling, as shown in the drawing, the bolt is passed through at a right angle with the felly, and through the center of the bevel-joint. This position of the bolt prevents lateral movement of the ends, and obviates the necessity of doweling the ends together.

This is a simple and efficient device, the means being adapted to the ends sought in the plainest and most common-sense manner.

Having thus described our invention, we claim as new and desire to secure by Letters Patent—

The combination, with two fellies, B B, having the oblique cut D on their opposite ends, of a radial bolt, E, having its head countersunk in the tire and its threaded end secured by nut and washer, substantially as and for the purpose described.

BENJAMIN PEARSON.
HORACE W. PEARSON.

Witnesses:
NELLIE M. PEARSON,
ELLEN C. PEARSON.